UNITED STATES PATENT OFFICE.

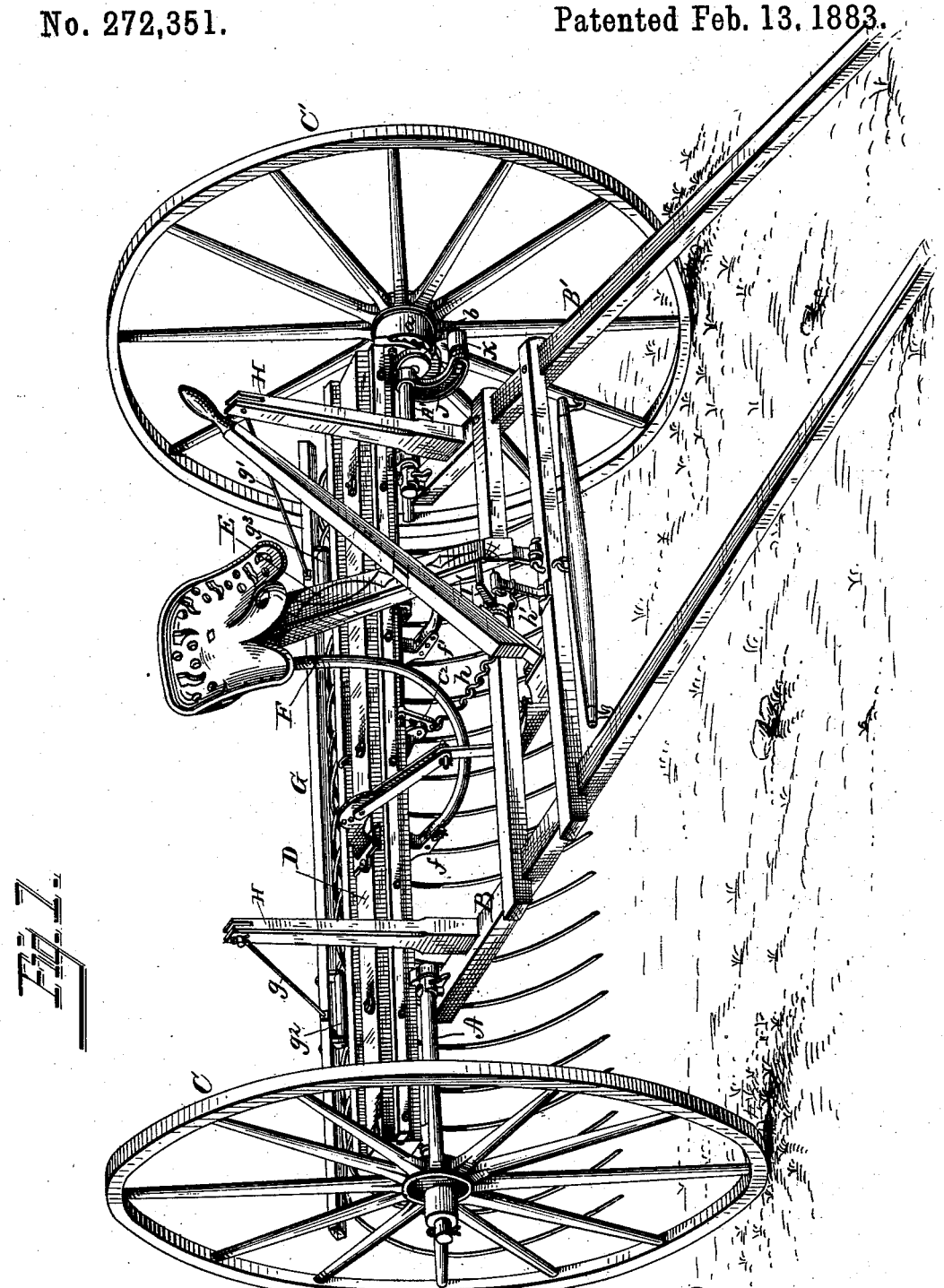

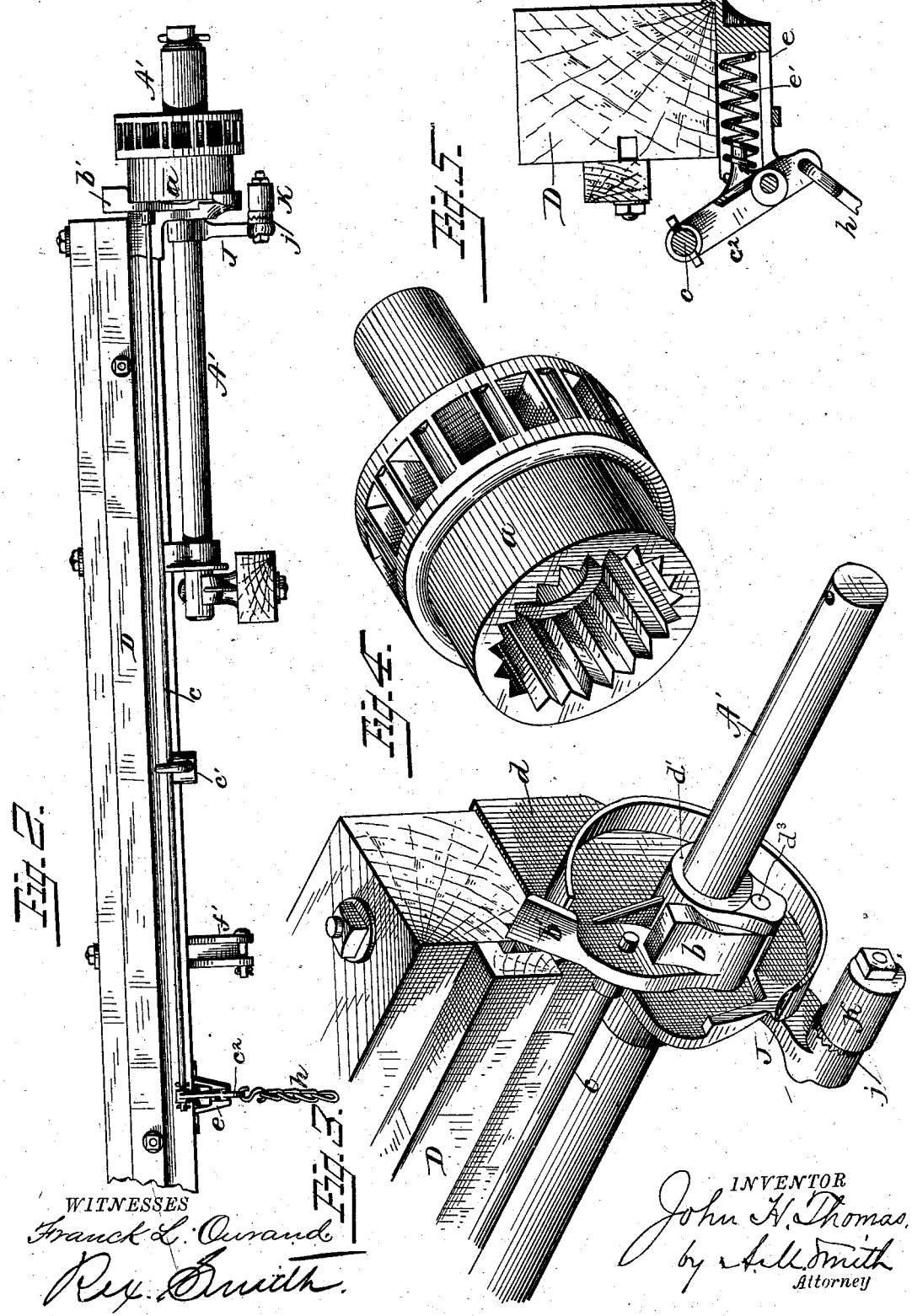

JOHN H. THOMAS, OF SPRINGFIELD, OHIO.

SULKY HAY-RAKE.

SPECIFICATION forming part of Letters Patent No. 272,351, dated February 13, 1883.

Application filed October 9, 1882. (No model.)

*To all whom it may concern:*

Be it known that I, JOHN H. THOMAS, of Springfield, county of Clarke, and State of Ohio, have invented new and useful Improvements in Sulky Hay-Rakes, of which the following is a full, clear, and exact description, reference being had to the accompanying drawings, making part of this specification.

My invention relates to that class of sulky hay-rakes in which the dumping or discharge of the load can be effected either by hand or by the power of the horse or team applied through the traction of the wheel or wheels and controlled by the driver in his seat, as the lay or formation of the ground or the condition of the crop operated upon may dictate; and it consists in a novel mechanism for effecting the dumping or discharge of the load and for releasing the rake for permitting it to return to working position after the load has been discharged, and in certain details of arrangement or combination of parts hereinafter explained.

In the accompanying drawings, Figure 1 is a perspective view of a rake having my improvement applied. Fig. 2 is a front elevation of a portion of the rake-head, showing one of the stationary axles and the hub of one of the carrying-wheels, with the mechanism for throwing the rake into engagement with the wheel for dumping it and for tripping or releasing the rake applied thereto. Fig. 3 is a perspective view of one end of said rake-head and axle, showing the pawl and its trip. Fig. 4 is a perspective view of the hub of one of the wheels, showing the internally-ratcheted rim or wheel applied thereto; and Fig. 5 represents a section through the rake-head, showing the arrangement of the lever and spring for actuating the dumping mechanism.

A and A' represent short stationary axles, rigidly secured to the side longitudinal bars, B and B', of the thill or draft frame; C and C', the carrying-wheels mounted thereon, and D the rake-head, connected by sleeve-brackets with the stationary axles in such manner as to permit it to be rocked thereon for dumping the rake.

E is the seat bar or support, hinged at its lower forward end to a transverse bar of the thill-frame and upheld at its rear upper end by means of a curved double or U-shaped (inverted) standard, F, hinged at its upper or loop end to the seat or seat-standard, and at the lower ends of the arms to angular brackets $ff'$, attached to the lower face of the rake-head. The horizontal forwardly-projecting portions of these arms have a number of perforations in them, permitting the adjustment of the ends of the standard backward and forward for adapting the weight of the driver to counterbalance, as nearly as may be desired, the weight of the rake-teeth and the clearing devices resting thereon in rear of the rake-head.

G represents the clearer rake-head, which is provided with horizontal or nearly horizontal teeth, which project forward between the rake-teeth, serving, when the latter are rocked upward, to prevent the load from rising with them, and thus to strip or clear the rake-teeth. This clearer-head is connected to standards H on the thill-frame by rods $g\ g'$, hinged to said standards at their upper ends, and it may also, if desired, be connected by a rod or link with the upper end of the seat-standard, in a manner similar to that described in Letters Patent granted to me August 7, 1877. This clearer-head is provided on its lower face near each end with brackets, in which small friction-rollers $g^2 g^3$ are pivoted, said rollers being by preference made of sufficient length each to rest and roll upon two of the rake-teeth when the latter are rocked.

I is the hand-lever, through which the hand dumping of the rake is effected, said lever having its fulcrum on the thill-frame, and being provided with an adjustable pedal, I', enabling the driver to apply his foot in dumping or in assisting to dump the load, if desired.

The construction thus far described is, for the greater part, similar to that described in former patents above referred to, and is set forth here that the operation of the mechanism, which will now be described, may be better understood.

The hub of one of the carrying-wheels C' (or C, as it may be applied to either or both) has attached to or formed upon its inner end an internally-ratcheted rim, $a$, (see Fig. 4,) and the sleeve-bracket $d$, connecting the adjacent end of the rake-head with the axle, has the sleeve $d'$, surrounding the latter, projected laterally within said rim, and provided with lugs or ears, in which a pawl, $b$, is pivoted, as at $d^3$, the outer end of which is adapted to engage with the internal ratchet of the rim $a$. The outer face of the pawl $b$ has a lever-arm, $b'$, formed upon it, which is outside of the ratchet rim or wheel and extends beyond the periphery thereof, forming a tripping-lever for releasing the pawl from the ratchet-wheel, as will be explained. The lever $b'$, at or near the center of its length, has one end of a horizontal rod or lever, $c$, connected with it, said rod or lever having its fulcrum in a lug or ear, $c'$, attached to the rake-head, the opposite end of said rod or lever $c$ being connected with the upper end of a short upright lever, $c^2$, also pivoted in a suitable lug or bracket, $e$, attached to the rake-head and projecting in front thereof, as shown in Fig. 5. This bracket is recessed to receive and retain a spring, $e'$, the outer or forward end of which rests and bears against the lever $c^2$, above the plane of its pivot or fulcrum, for pressing the upper end of said lever and the end of rod $c$, connected therewith, forward, thereby holding the outer end of said rod, to which the pawl $b$ is connected, crowded back, with the pawl held out of engagement with the ratchet-wheel $a$. The rear face of the lever $c^2$, where the spiral spring $e'$ rests against it, is provided with a point or spur, with which the spring engages, preventing displacement of the latter. The lower short arm of lever $c^2$ is connected by a cord or chain, $h$, with a treadle-lever, $h'$, pivoted at its lower end in a suitable bracket attached to the thill-frame. By this arrangement, the driver, by pressing his foot upon the treadle $h'$ and overcoming the tension of the spring $e'$, moves the upper end of lever $c^2$ and the end of the lever $c$, connected therewith, backward, thereby moving the outer end of said lever $c$ and the pawl $b$, connected therewith, forward and causing the pawl to engage the rake-head with the ratchet-wheel or rim $a$, and, through said rim, with the carrying-wheel for rocking the rake-teeth upward and discharging their load.

The axle $A'$ (or it may be $A$, or both) has a curved arm, $J$, rigidly connected with it in close proximity with the sleeve-bracket $d$, said arm being provided at its outer end with an eye or short perforated sleeve, $j$, having radial ribs on its outer face or end, as shown.

K is a short sleeve or cylinder provided with an eccentric longitudinal perforation, through which it is connected with the sleeve $j$ by a through-bolt, a radially-ribbed disk or collar at its inner end engaging with the corresponding "rose-face" on the end of sleeve K, and serving to hold the cylinder at any desired adjustment. The sleeve K projects outwardly within the path of the lever $b'$, attached to or formed upon the pawl $b$, and serves, by acting on said lever after the rake-teeth have been rocked upward to the desired height for discharging their load, to throw the pawl out of engagement with the ratchet-wheel, releasing the rake-head, and permitting the teeth to fall back into working position. The eccentric formation of the sleeve K, forming the tripping spur and the provision for its adjustment described, adapts it to be turned or adjusted for tripping the rake-head sooner or later, as may be desired, and for compensating for wear.

The arrangement of the pawl $b$, within the periphery of the internally-ratcheted wheel and upon an axis or pivot parallel with the axle on which said wheel revolves, as shown and described, is such as to adapt it to best withstand the strain thrown upon it, and permits the use of a light pawl, and, in connection with the arrangement for balancing the rake-head and the arrangement of the friction-rollers on the clearer, as described, enables me to materially reduce the weight of the tripping devices as compared with those in ordinary use.

Where the axle of the machine is made to form also the rocking rake-head, the tripping-arm J will of course be attached to the thill-frame or other stationary part of the machine.

Having now described my invention, I claim as new—

1. The combination, in a horse hay-rake, of the rocking rake-head, the internally-ratcheted rim or hub for actuating the same, and the pawl or dog located within said rim and connected with said rake-head through a pivot arranged within the periphery of said rim and parallel with the axis thereof, substantially as described.

2. The combination, with the rocking rake-head, of the internally-ratcheted rim or hub, the dog or pawl pivoted within said rim or hub on an axis parallel with the axis thereof, and a lever connected with the rake-head by a pivot at right angles thereto for actuating said dog, substantially as described.

3. The combination, in a horse hay-rake, of the rocking rake-head, the internal ratchet-rim, the pawl $b$, pivoted within said rim, levers $e$ and $e^2$, cord or chain $h$, and treadle $h'$, arranged and operating substantially as described.

4. The combination, with the rocking rake-head, ratchet-wheel $a$, and pawl $b$, provided with the arm or lever projecting beyond the periphery of said wheel, of the tripping-arm provided with the adjustable tripping eccentric, substantially as and for the purpose specified.

5. The combination, with the rocking rake head, of the internal ratchet-wheel and the pawl engaging therewith, of the rod or lever $c$, connected with the rake-head by a pivot at right angles to said head, the upright lever $c^2$, and spring $e'$, for moving said pawl, all arranged and operating substantially as described.

In testimony whereof I have hereunto set my hand this 6th day of October, A. D. 1882.

JOHN H. THOMAS.

Witnesses:
E. O. HAGAN,
F. M. HAGAN.